United States Patent
Ishihara (10) Patent No.: US 10,005,130 B2
(45) Date of Patent: Jun. 26, 2018

(54) MACHINE TOOL AND CUTTING METHOD

(71) Applicant: MURATA MACHINERY, LTD., Kyoto-shi, Kyoto (JP)

(72) Inventor: Tadashi Ishihara, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days. days.

(21) Appl. No.: 15/038,541

(22) PCT Filed: Oct. 23, 2014

(86) PCT No.: PCT/JP2014/078170
§ 371 (c)(1),
(2) Date: May 23, 2016

(87) PCT Pub. No.: WO2015/079836
PCT Pub. Date: Jun. 4, 2015

(65) Prior Publication Data
US 2016/0288214 A1    Oct. 6, 2016

(30) Foreign Application Priority Data

Nov. 29, 2013 (JP) .................................. 2013-247245

(51) Int. Cl.
*B23B 29/00* (2006.01)
*B23B 5/38* (2006.01)
(Continued)

(52) U.S. Cl.
CPC .................. *B23B 5/38* (2013.01); *B23B 1/00* (2013.01); *B23B 5/36* (2013.01); *B23B 3/06* (2013.01); *B23B 29/04* (2013.01)

(58) Field of Classification Search
CPC .... B23B 5/36; B23B 5/38; B23B 1/00; B23B 2200/28; B23B 27/16; B23B 2210/02; B23Q 5/045
See application file for complete search history.

(56) References Cited

U.S. PATENT DOCUMENTS 4,062,255 A * 12/1977 Perotti .................. B23B 51/106
  82/137
4,450,737 A *  5/1984 Hitt ........................... B23B 5/38
  82/1.4
(Continued)

FOREIGN PATENT DOCUMENTS

EP         1 375 064 A1    1/2004
JP         57-23903 A      2/1982
(Continued)

OTHER PUBLICATIONS

English translation of Official Communication issued in corresponding International Application PCT/JP2014/078170, dated May 31, 2016.
(Continued)

*Primary Examiner* — Sara Addisu
(74) *Attorney, Agent, or Firm* — Keating & Bennett, LLP (57) ABSTRACT

A machine tool cuts a workpiece having an inclined or curved surface and includes a main spindle that holds and rotates the workpiece, a moving device that moves a cutting tool relative to the workpiece in a direction obtained by combining a Z direction parallel or substantially parallel with the axis of the main spindle, an X direction that is perpendicular or substantially perpendicular to the Z direction and determines the amount of cutting of the workpiece, and a Y direction perpendicular or substantially perpendicular to the Z direction and the X direction, and an angle setting mechanism that causes the direction of an edge of the cutting tool to match the inclined surface of the workpiece by inclining the direction of the edge with respect to the Z direction when seen from the Y direction in a state in which the direction of the edge is inclined with respect to the Z direction when seen from the X direction.

14 Claims, 9 Drawing Sheets

(51) Int. Cl.
    *B23B 5/36*    (2006.01)
    *B23B 1/00*    (2006.01)
    *B23B 3/06*    (2006.01)
    *B23B 29/04*    (2006.01)

(56) References Cited

U.S. PATENT DOCUMENTS

| | | | |
|---|---|---|---|
| 6,453,782 B1 | 9/2002 | Yamazaki et al. | |
| 6,708,382 B2* | 3/2004 | Yamazaki | B23B 27/1662 |
| | | | 29/27 C |
| 6,715,386 B2* | 4/2004 | Maier | B23B 3/164 |
| | | | 82/1.11 |
| 6,865,789 B2* | 3/2005 | Katoh | B23B 29/242 |
| | | | 29/39 |
| 7,216,571 B2 | 5/2007 | Schreiber et al. | |
| 2003/0221525 A1* | 12/2003 | Katoh | B23B 29/242 |
| | | | 82/121 |
| 2005/0160887 A1* | 7/2005 | Erickson | B23B 1/00 |
| | | | 82/121 |
| 2015/0056025 A1* | 2/2015 | Guo | B23C 5/003 |
| | | | 407/33 |
| 2016/0368060 A1* | 12/2016 | Ishihara | B23B 1/00 |

FOREIGN PATENT DOCUMENTS

| | | |
|---|---|---|
| JP | 2701706 B2 | 1/1998 |
| JP | 2009-241221 A | 10/2009 |
| WO | 2004/022270 A1 | 3/2004 |

OTHER PUBLICATIONS

Official Communication issued in corresponding European Patent Application No. 14865349.6, dated Jun. 20, 2017.

\* cited by examiner

MACHINE TOOL AND CUTTING METHOD

BACKGROUND OF THE INVENTION

1. Field of the Invention

The present invention relates to a machine tool for cutting a workpiece having an inclined surface or curved surface, and a cutting method.

2. Description of the Related Art

A lathe, which is a type of machine tool, holds a workpiece to be machined, on a rotation axis (spindle) and performs cutting or the like on the workpiece using a machining tool such as a cutting tool while rotating the workpiece (see Japanese Patent No. 2701706). For example, when a workpiece having an inclined surface is machined using a lathe including a spindle having a tapered fitting portion, the lathe cuts the workpiece while determining the amount of cutting in accordance with the inclination of the inclined surface and moving the machining tool in the direction of the rotation axis. However, it is difficult to obtain the required surface roughness by simply cutting the workpiece in such a manner. For this reason, the required surface roughness is obtained, for example, by pre-machining the workpiece using the lathe and then finishing it by grinding the inclined surface thereof using an angular grindstone or the like.

However, in order to pre-machine the workpiece using the lathe and then finish it using a grindstone as described above, it is necessary to unload the workpiece from the lathe and then newly set the workpiece on a grinder. Accordingly, the entire machining time is increased. Further, when the workpiece is rotated on the grinder, the amount of grinding when the angular grindstone contacts the workpiece varies between the inner circumference and outer circumference of the inclined surface, since the circumferential velocity varies between the inner circumference and outer circumference of the inclined surface. This may make it difficult to obtain uniform surface roughness, that is, to obtain the required surface roughness.

SUMMARY OF THE INVENTION

Preferred embodiments of the present invention provide a machine tool and a cutting method that, when cutting an inclined surface or curved surface, finish a machined surface with high surface roughness and reduce machining time by omitting a grinding step using a grindstone.

According to a preferred embodiment of the present invention, a machine tool for cutting a workpiece having an inclined surface or a curved surface includes a main spindle that holds and rotates the workpiece, a moving device that moves a cutting tool relative to the workpiece in a direction obtained by combining a Z direction parallel or substantially parallel with an axis of the main spindle, an X direction that is perpendicular or substantially perpendicular to the Z direction and determines the amount of cutting of the workpiece, and one of a Y direction perpendicular or substantially perpendicular to the Z direction and the X direction and an axis rotation direction parallel or substantially parallel with the Z direction, the cutting tool including a linear cutting blade to cut the workpiece, and a tool positioner that causes a direction of an edge of the cutting tool to match the inclined surface or the curved surface of the workpiece by inclining the direction of the edge with respect to the Z direction when seen from the Y direction in a state in which the direction of the edge is inclined with respect to the Z direction when seen from the X direction.

The machine tool may further include a tool post that holds the cutting tool, and the moving device may move the cutting tool in the Z direction, the X direction, and the Y direction through the tool post. The tool positioner may be located between the tool post and the cutting tool. The tool positioner may include an angle setting mechanism that sets an angle of the edge with respect to the Z direction when seen from the Y direction. The angle setting mechanism may include a shaft with a rotation axis along the Y direction and a holder that is located on a portion of the shaft and holds the cutting tool. The machine tool may further include a lock sleeve that is press-fitted between the holder and the shaft and holds a rotation position of the shaft. The machine tool may further include an adjustment mechanism that adjusts the rotation position of the shaft. The machine tool may further include a drive system that rotates the shaft with respect to the holder and holds the shaft in a predetermined rotation position.

According to another preferred embodiment of the present invention, a method for cutting a workpiece having an inclined surface or a curved surface includes a step of rotating the workpiece, a step of causing a cutting tool having a linear cutting blade to cut the workpiece to match the inclined surface or the curved surface of the workpiece by inclining the cutting tool with respect to a Z direction parallel or substantially parallel with a rotation axis of the workpiece, and a step of cutting the workpiece while moving the cutting tool relative to the workpiece in a direction obtained by combining the Z direction, an X direction that is perpendicular or substantially perpendicular to the Z direction and determines the amount of cutting of the workpiece, and one of a Y direction perpendicular or substantially perpendicular to the Z direction and the X direction and an axis rotation direction parallel or substantially parallel with the Z direction.

According to various preferred embodiments of the present invention, the cutting tool having the linear cutting blade is moved relative to the rotating workpiece in the direction obtained by combining the Z direction, the X direction, and the Y direction or the axis rotation direction parallel or substantially parallel with the Z direction; the direction of the edge of the cutting tool is caused to match the inclined surface or curved surface of the workpiece by inclining the direction of the edge with respect to the Z direction when seen from the Y direction in a state in which the direction of the edge is inclined with respect to the Z direction when seen from the X direction; and the inclined surface or curved surface of the workpiece is cut. Accordingly, when the workpiece and cutting tool are moved relative to the Y direction, the edge of the cutting tool smoothly cuts into the workpiece. Thus, it is possible to significantly reduce or prevent unwanted vibration of the workpiece and to improve the surface roughness of the machined surface of the workpiece. Also, since the machined surface is finished with improved surface roughness, it is possible to omit the conventional grinding step for finishing and to reduce the time required to machine the workpiece.

If the machine tool further includes the tool post that holds the cutting tool and the moving device moves the cutting tool in the Z direction, the X direction, and the Y direction through the tool post, the cutting tool is stably moved in the Z direction and the like. If the tool positioner is provided between the tool post and the cutting tool, the direction of the edge of the cutting tool is easily caused to match the inclined surface or the like of the workpiece. If the tool positioner includes the angle setting mechanism that sets the angle of the edge with respect to the Z direction when seen from the Y direction, the direction of the edge of the cutting tool is easily set to an angle matching the inclined surface or the like of the workpiece. If the angle setting mechanism includes the shaft having a rotation axis along the Y direction and the holder provided on a portion of the shaft to hold the cutting tool, the holder is rotated with the rotation of the shaft and thus the direction of the edge is correctly changed. If the machine tool further includes the lock sleeve that is press-fitted between the holder and the shaft and holds the rotation position of the shaft, the direction of the edge of the cutting tool is reliably fixed. If the machine tool further includes the adjustment mechanism that adjusts the rotation position of the shaft, it is possible to fine-adjust the direction of the edge of the cutting tool by adjusting the rotation position of the shaft.

If the machine tool further includes the drive system that rotates the shaft with respect to the holder and holds the shaft in a predetermined rotation position, the direction of the edge of the cutting tool is able to be moved in accordance with the inclination of the inclined surface or the like of the workpiece. Further, it is possible to easily adjust the angle of the edge, as well as to cut the curved surface by changing the angle of the edge while moving the cutting tool in the Z direction.

According to the cutting method of a preferred embodiment of the present invention, the cutting tool is caused to match the inclined surface or curved surface of the workpiece by inclining the cutting tool with respect to the Z direction. Thus, the inclined surface or curved surface of the workpiece is easily cut with improved surface roughness.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4A is a sectional view taken along line A-A in FIG. 3A, FIG. 4B is a sectional view taken along line B-B in FIG. 3B.

DETAILED DESCRIPTION OF THE PREFERRED EMBODIMENTS

Preferred embodiments of the present invention will be described with reference to the drawings. However, the present invention is not limited thereto. To clarify the preferred embodiments, the drawings are scaled as appropriate, for example, partially enlarged or highlighted. In the drawings, directions will be shown by an XYZ coordinate system. In the XYZ coordinate system, a plane parallel or substantially parallel with the horizontal plane is defined as a YZ plane. The direction of the rotation axis of a main spindle 7 (counter spindle 8) in the YZ plane is defined as a Z direction, and a direction perpendicular or substantially perpendicular to the Z direction is defined as a Y direction. A direction perpendicular or substantially perpendicular to the YZ plane is defined as an X direction. The X direction represents a direction that is perpendicular or substantially perpendicular to the Z direction and determines the amount of cutting of a workpiece. In the drawings, directions shown by arrows are the positive directions of the X, Y, and Z directions, and opposite directions are the negative directions thereof.

First Preferred Embodiment

Figure 1A:
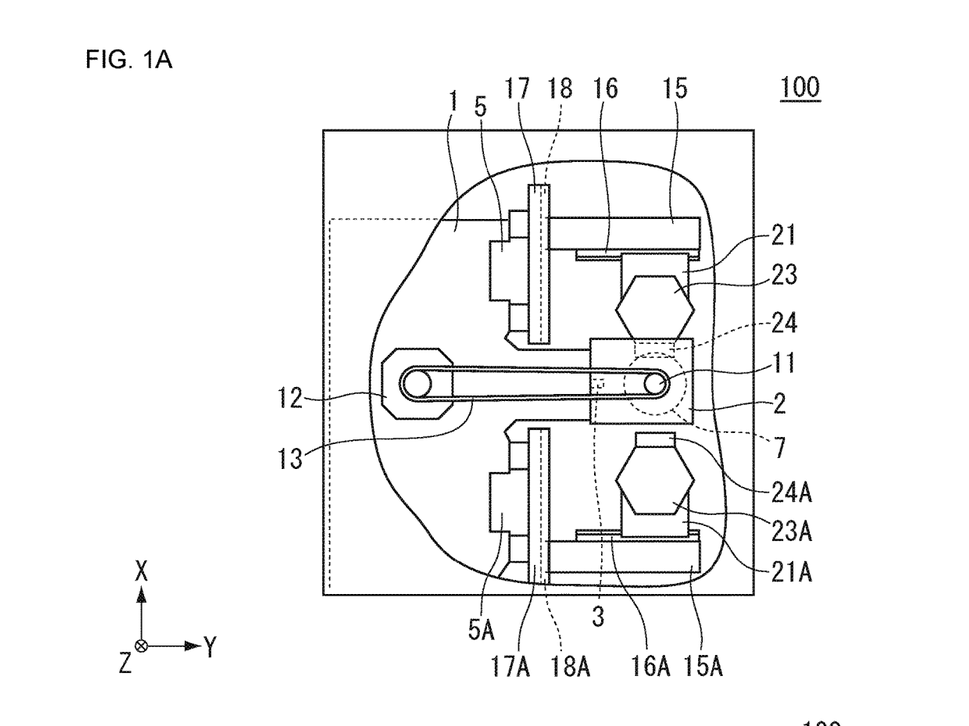
FIGS. 1A and 1B are a side view and a front view showing an example of a major portion of a machine tool according to a first preferred embodiment of the present invention.
Figure 1B:
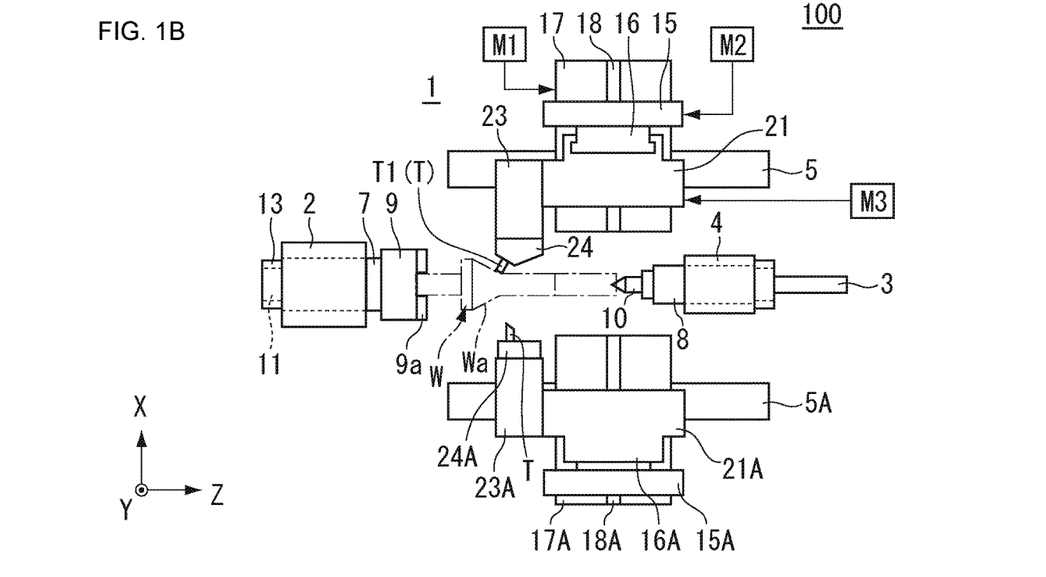

A machine tool 100 according to a first preferred embodiment will be described with reference to the drawings. FIGS. 1A and 1B includes diagrams showing an example of a major portion of the machine tool 100 according to the first preferred embodiment, in which FIG. 1A is a side view; and FIG. 1B is a front view. The machine tool 100 shown in FIGS. 1A and 1B is a lathe. In FIGS. 1A and 1B, the front of the machine tool 100 is located on the positive Y side, and the back thereof is located on the negative Y side. Both sides of the machine tool 100 are located on the positive and negative Z sides, and the Z direction represents the horizontal direction of the machine tool 100.

As shown in FIGS. 1A and 1B, the machine tool 100 includes a base 1. The base 1 includes a headstock 2 and a tailstock 4. The headstock 2 rotatably supports a main spindle 7 through a bearing or the like (not shown). While the headstock 2 is fixed to the base 1, it may be movable in the Z, X, Y, or other directions by driving a motor or the like. The main spindle 7 includes a chuck driver 9 at the positive-Z-side end thereof. The chuck driver 9 causes multiple grasping claws 9a to move in the radial direction of the main spindle 7 and to hold a workpiece W. While, in FIGS. 1A and 1B, the workpiece W is grasped by three grasping claws 9a equally spaced around the rotation axis of the main spindle 7, other configurations may be used. The number or shape of the grasping claws 9a may be any number or shape as long as they can hold the workpiece W.

The negative-Z-side end of the main spindle 7 protrudes from the headstock 2 in the negative Z direction and has a pulley 11 mounted thereon. A belt 13 runs between the pulley 11 and the rotation axis of a motor 12 disposed in the base 1. Thus, the main spindle 7 is rotated by the drive of the motor 12 through the belt 13. The motor 12 is driven by a controller (not shown). The motor 12 is, for example, a motor including a torque control mechanism. The main spindle 7 need not be driven by the motor 12 and belt 13; the drive of the motor 12 may be transmitted to the main spindle 7 using a gear train or the like, or the motor 12 may directly rotate the main spindle 7.

The tailstock 4 is movable along a Z-direction guide 3 disposed on the base 1. The tailstock 4 rotatably supports the counter spindle 8 through a bearing or the like (not shown). The rotation axes of the main spindle 7 and counter spindle 8 are in the same direction and are in the Z direction. The tailstock 4 has a center 10 mounted on the negative-Z-side end thereof.

The workpiece W held by the grasping claws 9a has a cylindrical shape with a tapered inclined surface Wa. The inclined surface Wa has a diameter that gradually decreases from the side of the main spindle 7 toward the side of the counter spindle 8. The workpiece W need not be that shown in FIGS. 1A and 1B; for example, the angle of the inclined surface may be larger or smaller than that of the workpiece W in FIGS. 1A and 1B. The workpiece W may be one having an inclined surface whose diameter gradually increases from the side of the main spindle 7 to the side of the counter spindle 8. The workpiece W may also have multiple inclined surfaces Wa. The workpiece W may also be one having an inclined surface whose angle changes partially.

As shown in a dot-and-dash line in FIG. 1B, if the workpiece W has a long length (is long in the Z direction), the positive-Z-side end of the workpiece W is held by the center 10 of the tailstock 4. Thus, the long workpiece W is rotated while sandwiched between the main spindle 7 and counter spindle 8. As a result, the workpiece W is rotated stably during cutting. If the workpiece W has a short length (is short in the Z direction), it is rotated while held by only the grasping claws 9a of the main spindle 7. In this case, the tailstock 4 need not be used.

As shown in FIGS. 1A and 1B, a Z-direction guide 5 is disposed on the base 1 in the Z direction. A Z-direction guide 5A similar to the Z-direction guide 5 is disposed in a negative X position of the Z-direction guide 5 in the Z direction. The Z-direction guides 5 and 5A are provided with Z-axis slides 17 and 17A, respectively, that move in the Z direction along the Z-direction guides 5 and 5A. As shown in FIG. 1B, the Z-axis slide 17 is moved in the Z direction by the drive of a Z-direction drive system (moving device) M1 and held in position. The Z-direction drive system M1 is, for example, an electric motor or hydraulic system. The Z-axis slide 17A is provided with a drive system similar to the Z-direction drive system M1, and is moved in the Z direction by the drive of this drive system and held in position. The configuration of the Z-axis slide 17A may be the same as or different from that of the Z-direction drive system M1. The Z-axis slides 17 and 17A may be provided with a common Z-direction drive system M1 such that one or both thereof is driven by the common Z-direction drive system.

The Z-axis slides 17 and 17A include X-direction guides 18 and 18A, respectively, thereon. The Z-axis slides 17 and 17A are also provided with X-axis slides 15 and 15A, respectively, that are movable along the X-direction guides 18 and 18A. The X-axis slide 15 is moved in the X direction by the drive of an X-direction drive system (moving device) M2 and held in position. The X-direction drive system M2 is, for example, an electric motor or hydraulic system. The X-axis slide 15A is provided with a drive system similar to the X-direction drive system M2, and is moved in the X direction by the drive of this drive system and held in position. The configuration of the drive system of the X-axis slide 15A may be the same as or different from that of the X-direction drive system M2.

The X-axis slides 15 and 15A include Y-direction guides 16 and 16A, respectively, thereon. The X-axis slides 15 and 15A are also provided with tool post drivers 21 and 21A, respectively, that are movable along the Y-direction guides 16 and 16A. The tool post driver 21 is moved in the Y direction by the drive of a Y-direction drive system (moving device) M3 and held in position. The Y-direction drive system M3 is, for example, an electric motor or hydraulic system. The tool post driver 21A is provided with a drive system similar to the Y-direction drive system M3, and is moved in the Y direction by the drive of this drive system and held in position. The configuration of the drive system of the tool post driver 21A may be the same as or different from that of the Y-direction drive system M3.

The tool post drivers 21 and 21A include rotation drivers, such as motors. The tool post driver 21 includes a first turret (tool post) 23 mounted thereon. The first turret 23 is capable of being rotated using the Z direction as the axis by the drive of the rotation driver. Similarly, the tool post driver 21A includes a second turret (tool post) 23A mounted thereon. The second turret 23A is capable of being rotated using the Z direction as the axis by the drive of the rotation driver. The first turret 23 is disposed over the workpiece W (the positive X side), and the second turret 23A is disposed under the workpiece W (the negative X side). The first and second turrets 23 and 23A are disposed such that the workpiece W is sandwiched therebetween.

The first and second turrets 23 and 23A include, on the circumferential surfaces thereof, multiple holding portions that hold cutting tools T. The cutting tools T are held in all or some of the holding portions. Accordingly, the desired cutting tool T is selected by rotating the first and second turrets 23 and 23A. The cutting tools T held in the holding portions of the first and second turrets 23 and 23A are able to be replaced on a holding portion basis. The cutting tools T include cutting tools that cut the workpiece W, as well as rotating tools, such as a drill and an end mill. The rotating tools, such as a drill, are mounted on the rotation axes of small motors contained in holding portions and used.

A tool holding base 24 is provided on one of the holding portions of the first turret 23, and a tool holding base 24A is provided on one of the holding portions of the second turret 23A. The configurations of the tool holding bases 24 and 24A may be the same or different. The second turret 23A need not be provided with the tool holding base 24A.

Mounted on the tool holding base 24 is a cutting tool T1 that machines the inclined surface Wa of the workpiece W. That is, the cutting tool T1 is held by the first turret 23 through the tool holding base 24. On the other hand, the cutting tool T is mounted on the tool holding base 24A. That is, a cutting tool T is held by the second turret 23A through the tool holding base 24A. The cutting tool T mounted on the tool holding base 24A may be the same as or different from the cutting tool T1 mounted on the tool holding base 24.

While, in the machine tool machine tool 100 shown in FIGS. 1A and 1B, the cutting tools T and T1 are disposed on the positive and negative X sides of the workpiece W such that the workpiece W is sandwiched therebetween, only one of the cutting tools may be provided. While the cutting tools T and T1 are disposed in the X direction (the vertical direction) of the workpiece W, they may be disposed in the horizontal direction (the Y direction) of the workpiece W. While a controller (not shown) causes the cutting tools T and T1 to cut the workpiece W, it may cause only one of the cutting tools to cut the workpiece W. The controller may also use both cutting tools alternately.

While, in FIGS. 1A and 1B, the first and second turrets 23 and 23A are used as tool posts, other types of tool posts may be used. For example, comb-shaped tool posts may be used. If comb-shaped tool posts are used, the cutting tools T are held on the teeth of each comb-shaped tool post, and one of the cutting tools T is selected by moving the comb-shaped tool post in the direction in which the teeth are arranged.

Figure 2A:
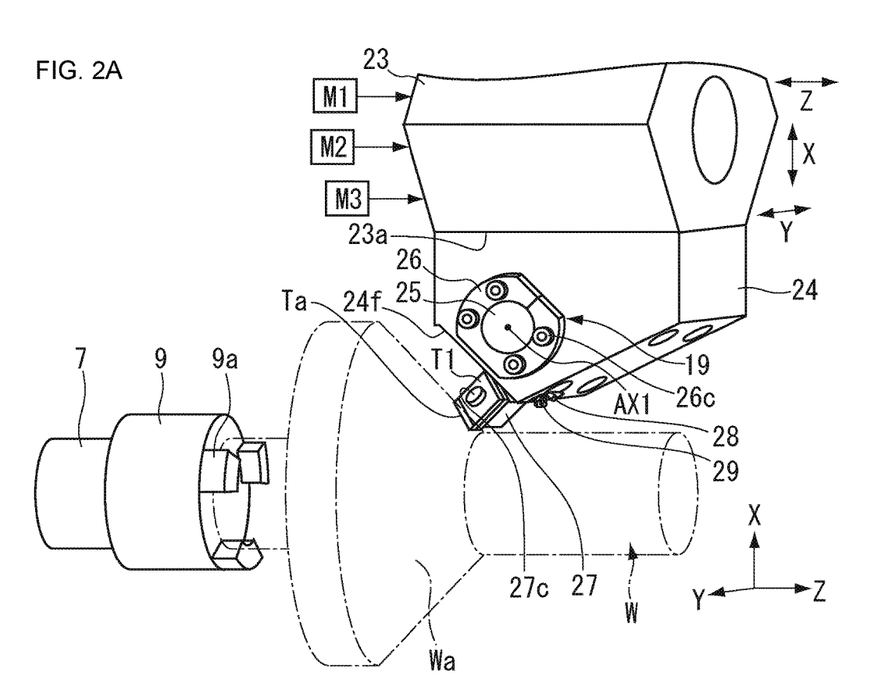
FIGS. 2A and 2B are a perspective view and a front view showing in an enlarged manner a portion corresponding to a workpiece.
Figure 2B:
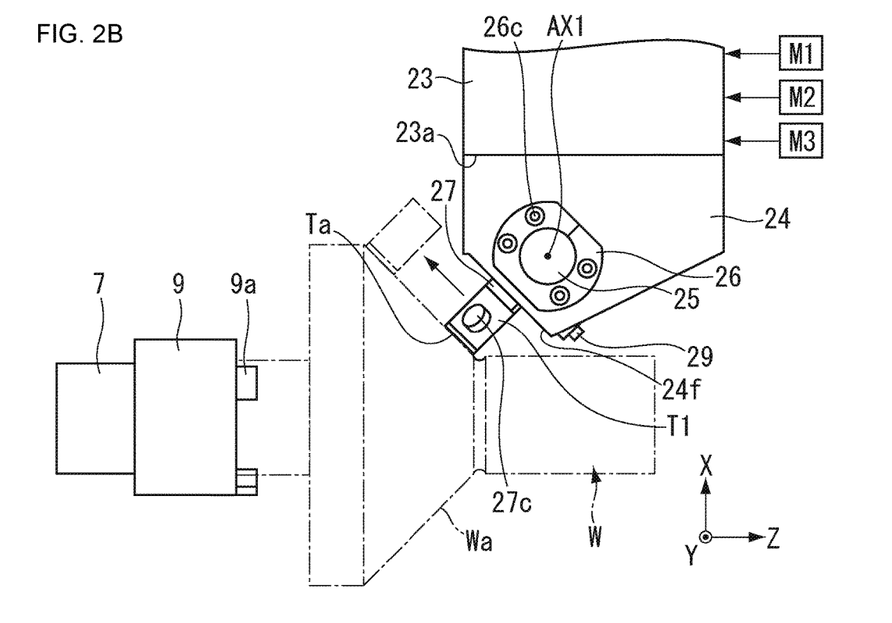

FIGS. 2A and 2B are enlarged views of a major portion including the main spindle 7 and first turret 23, which is a portion corresponding to the workpiece W, in which FIG. 2A is a perspective view; and FIG. 2B is a front view. As shown in FIGS. 2A and 2B, the tool holding base 24 is mounted on the negative-X-side surface 23a of the first turret 23. The tool holding base 24 is moved in the Z direction and X direction integrally with the first turret 23 by the Z-direction drive system M1 and X-direction drive system M2. The tool holding base 24 is also moved in the Y direction by the Y-direction drive system M3. Accordingly, the tool holding base 24 is disposed such that it is movable with respect to the workpiece W in the Z direction, X direction, and Y direction by the Z-direction drive system M1, X-direction drive system M2, and Y-direction drive system M3, respectively.

Thus, when the Z-axis slide 17 (17A), tool post driver (21A), and tool holding base 24 (24A) are driven by the Z-direction drive system M1, X-direction drive system M2, and Y-direction drive system M3, respectively, the cutting tool T1 (T) is movable with respect to the workpiece W in a direction obtained by combining all or some of the Z direction, X direction, and Y direction.

Figure 3A:
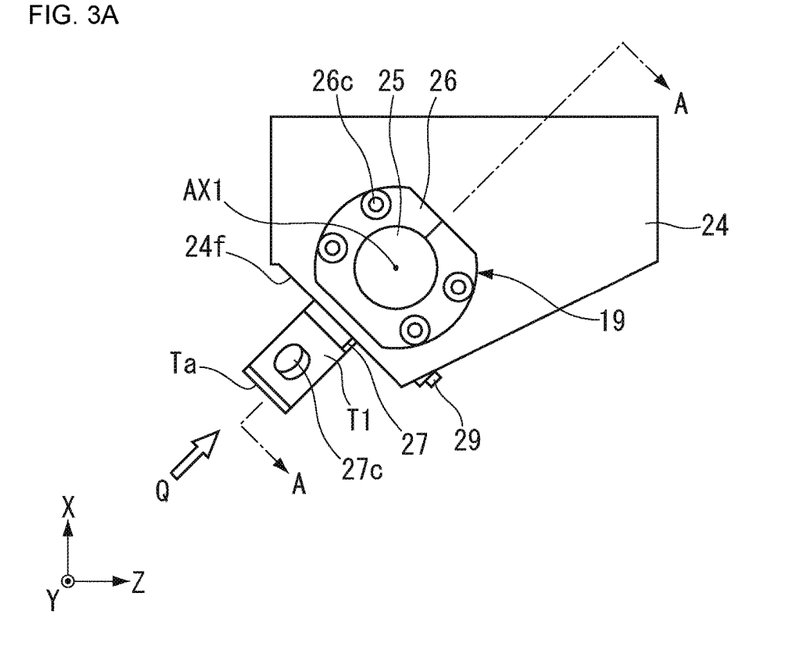
FIG. 3A is a front view and FIG. 3B is a view from a direction Q in FIG. 3A showing an example of a tool holding base.
Figure 3B:
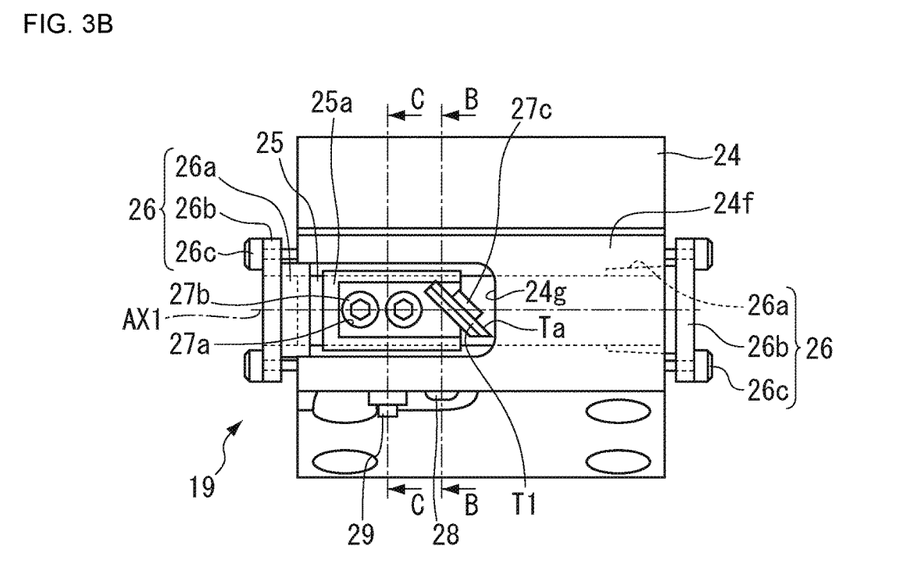

FIGS. 3A and 3B are diagrams showing an example of the tool holding base 24, in which FIG. 3A is a front view (a diagram seen from the Y direction); and FIG. 3B is a diagram seen from a direction Q in FIG. 3A. As shown in FIGS. 3A and 3B, the tool holding base 24 includes a tool disposition surface 24f having the cutting tool T1 disposed thereon. The tool disposition surface 24f is inclined with respect to a surface 23a (the YZ plane) of the first turret 23 and is oriented toward the main spindle 7. The cutting tool T1 is held by the tool holding base 24 through an angle setting mechanism (tool positioner) 19. The cutting tool T1 has a blade formed so as to be linear (linear cutting blade). As shown in FIG. 3A, the direction of the edge Ta of the linear cutting blade is inclined with respect to the Z direction when seen from the Y direction. Also, as shown in FIG. 3B, the direction of the edge Ta seen from the direction Q is also inclined. Accordingly, the direction of the edge Ta seen from the X direction is also inclined with respect to the Z direction.

Figure 4A:
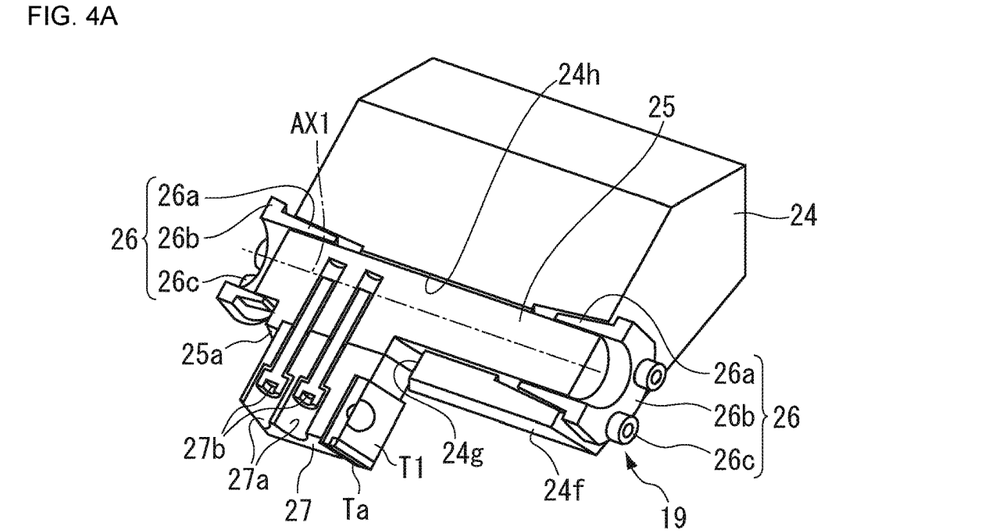
Figure 4B:
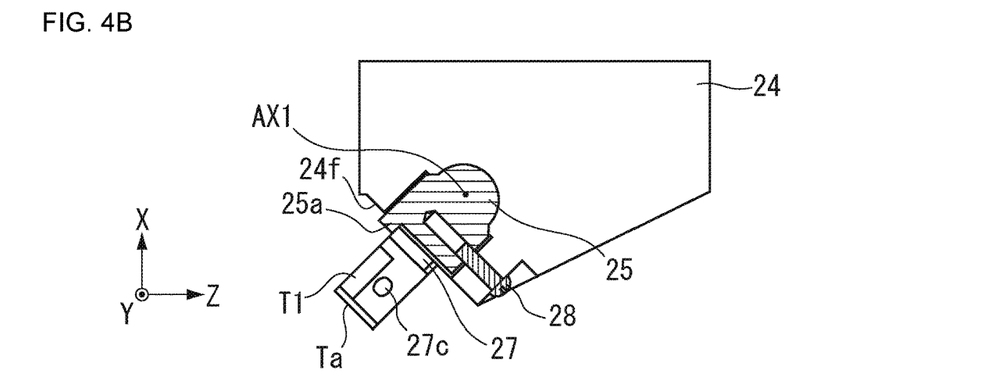
Figure 4C:
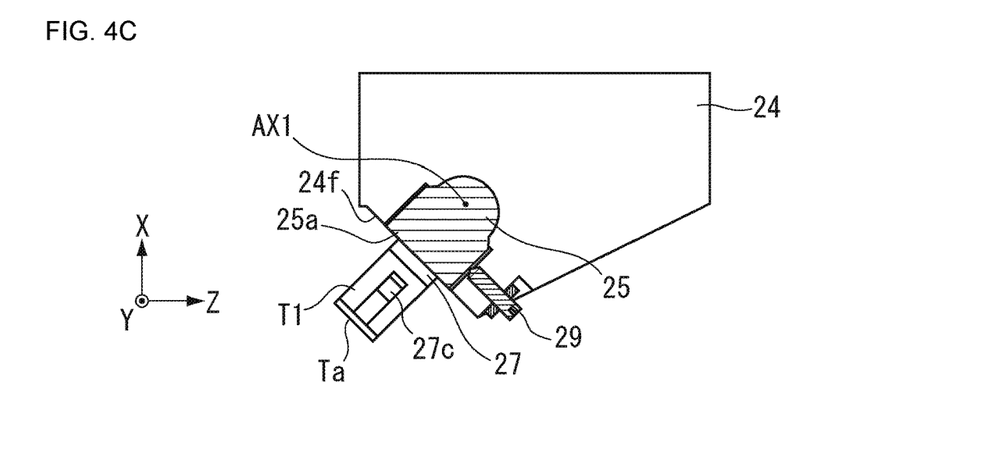
FIG. 4C is a perspective view taken along line C-C in FIG. 3B, showing an example of an angle setting mechanism.

The angle setting mechanism 19 will be described with reference to FIGS. 3A and 3B, as well as FIGS. 4A-4C. FIGS. 4A-4C include diagrams showing an example of the angle setting mechanism 19, in which FIG. 4A is a sectional view taken along line A-A in FIG. 3A; FIG. 4B is a sectional view taken along line B-B in FIG. 3B; and FIG. 4C is a sectional view taken along line C-C in FIG. 3B. As shown in FIG. 4A, the tool holding base 24 includes a through hole 24h parallel or substantially parallel with the Y direction. A support shaft (shaft) 25 is disposed in the through hole 24h and is preferably cylindrical. The through hole 24h has a larger diameter than the support shaft 25, and a gap is provided between the support shaft 25 and the inner wall of the through hole 24h. For this reason, the support shaft 25 is disposed in the through hole 24h so as to be rotatable about a rotation axis AX1 parallel or substantially parallel with the Y direction.

The through hole 24h has increased diameters at both ends of the tool holding base 24 in the Y direction. Lock sleeves 26 are press-fitted into these increased diameter portions. The lock sleeves 26 are mounted in two positions on the positive-Y-side and negative-Y-side surfaces of the tool holding base 24. Each lock sleeve 26 includes a press-fitting portion 26a, a flange 26b, and bolts 26c. The press-fitting portion 26a is press-fitted between the inner wall of the through hole 24h and the support shaft 25. The press-fitting portion 26a regulates the rotation of the support shaft 25. The flange 26b is disposed along the positive-Y-side surface or negative-Y-side surface of the tool holding base 24. The flange 26b is fixed to the tool holding base 24 through the bolts 26c. The rotation position of the support shaft 25 is held by the lock sleeve 26.

The support shaft 25 includes a holder mounting portion 25a disposed on a portion of the perimeter thereof. The holder mounting portion 25a protrudes from the circumferential surface of the support shaft 25 toward the tool disposition surface 24f. The tool disposition surface 24f includes an opening 24g from which and the holder mounting portion 25a protrudes. The holder mounting portion 25a includes a holder 27 mounted thereon. For example, the holder 27 includes multiple bolt holes 27a so that it is fastened to the holder mounting portion 25a of the support shaft 25 through fastening members, such as bolts 27b. The holder 27 holds the cutting tool T1.

The cutting tool T1 is fastened to the holder 27 through a fastening member 27c. While a throw away tip, which is able to be replaced using the fastening member 27c, is preferably used as an example of the cutting tool 27c in FIGS. 3A, 3B and 4A-4C, other types of cutting tools may be used. For example, a cutting tool in which an edge is integral with the holder 27 may be used. Such a cutting tool is detachable from the holder mounting portion 25a.

The cutting tool T1 is fastened to the holder 27 through a fastening member 27c. While a throw away tip, which is able to be replaced using the fastening member 27c, is preferably used as an example of the cutting tool T1 in FIGS. 3A, 3B and 4A-4C, other types of cutting tools may be used. For example, a cutting tool in which an edge is integral with the holder 27 may be used. Such a cutting tool is detachable from the holder mounting portion 25a.

The support shaft 25, lock sleeves 26, and holder 27 define the angle setting mechanism 19 that sets the angle of the direction of the edge Ta of the cutting tool T1 with respect to the Z direction when seen from the Y direction. The angle setting mechanism 19 is provided between the first turret 23 and cutting tool T1. The support shaft 25 need not be disposed on the tool holding base 24 and, for example, may be disposed in the first turret 23 or may be disposed so as to be sandwiched between the first turret 23 and tool holding base 24.

As shown in FIG. 3B, a predetermined gap is provided between the opening 24g of the tool holding base 24 and the holder mounting portion 25a of the support shaft 25. For this reason, when the support shaft 25 is rotated, the holder mounting portion 25a is able to be rotated with respect to the rotation axis AX1 by this gap. When the holder mounting portion 25a is rotated, the cutting tool T1 is rotated. Thus, it is possible to set the angle of the direction of the edge Ta with respect to the Z direction when seen from the Y direction.

As shown in FIGS. 3B, 4B, and 4C, the tool holding base 24 includes a pull bolt 28 and a push bolt 29 as adjustment mechanisms disposed therein. The pull bolt 28 and push bolt 29 are inserted from the surface of the tool holding base 24 into the inside thereof, and the front ends of these bolts are connected to the holder mounting portion 25a. The front end of the pull bolt 28 is screw-connected to the holder mounting portion 25a. By rotating the push bolt 29 and thus, for example, pulling the holder mounting portion 25a, the angle of the edge Ta is fine-adjusted. The push bolt 29 is screw-connected to a nut fixed to the tool holding base 24, as well as is in contact with the holder mounting portion 25a by the front end thereof. By rotating the pull bolt 28 and thus pushing away the holder mounting portion 25a, the angle of the edge Ta is fine-adjusted.

The numbers and disposition of the pull bolt 28 and push bolt 29 are not limited to those described above. Further, the pull bolt 28 and push bolt 29 need not be used as adjustment mechanisms, and other adjustment mechanisms capable of fine-adjusting the angle of the edge Ta may be used. Furthermore, the adjustment mechanisms are optionally provided and may not be omitted.

Figure 5:
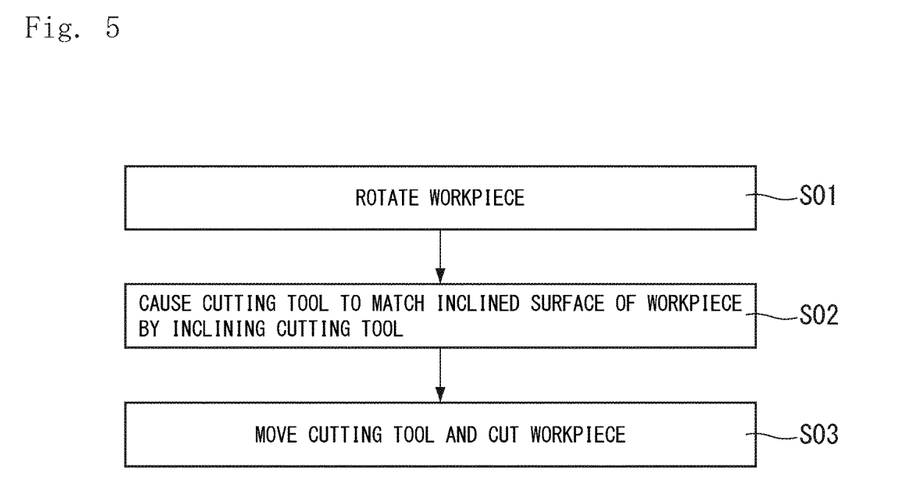
FIG. 5 is a flowchart showing an example of a cutting method according to the first preferred embodiment of the present invention.

Next, the operation of the machine tool 100 thus configured will be described with reference to the drawings. FIG. 5 is a flowchart showing the operation of the machine tool 100.

First, the main spindle 7 is caused to hold the workpiece W to be machined. For example, a workpiece conveyor (not shown) moves to the loading position to load the workpiece W to be machined and conveys the workpiece W to the main spindle 7; and then an edge of the workpiece W is held by the grasping claws 9a. If the workpiece W has a long length, the other edge of the workpiece W may be held by the center 10 of the counter spindle 8. The series of operations from the conveyance of the workpiece W by the workpiece conveyor to the holding of the workpiece W by the grasping claws 9a may be performed, for example, in accordance with an instruction from a controller (not shown) or manually by the operator.

After holding the workpiece W, the motor 12 is driven to rotate the main spindle 7, thus rotating the workpiece W (step S01). Note that if the workpiece W is held by the main spindle 7 and counter spindle 8, these spindles are rotated in synchronization with each other. The number of revolutions of the workpiece W is set in accordance with the machining process as appropriate. On the other hand, the cutting tool T1 is selected, and the angle of the edge Ta is set. First, the first turret 23 (23A) is rotated to select the cutting tool T1. Then, the inclination of the cutting tool T1 is set such that the edge Ta of the cutting tool T1 matches the inclined surface Wa of the workpiece W (step S02). Note that the selection of the cutting tool T1 and the setting of the angle of the edge Ta may be performed prior to rotating the workpiece W.

The inclination of the cutting tool T1 is set using the angle setting mechanism 19 in the following steps. The initial step involves loosening the bolts 26c of the lock sleeves 26 press-fitted into the two positions of the tool holding base 24 and moving the press-fitting portions 26a in the Y direction to make the support shaft 25 rotatable as shown in FIG. 4A. The subsequent step involves rotating the support shaft 25 about the rotation axis AX1 to rotationally move the holder 27 about the Y axis. Thus, the inclination of the holder 27 is changed, thus changing the direction of the edge Ta of the cutting tool T1 with respect to the Z direction.

The final step involves determining the rotation position of the support shaft 25 such that the direction (inclination) of the edge Ta becomes the desired direction and then fastening the bolts 26c of the lock sleeves 26 to fix the rotation position of the support shaft 25. As a result, the direction of the edge Ta is set to the desired inclination. Note that the inclination of the edge Ta may be fine-adjusted using the pull bolt 28 and push bolt 29 as necessary.

When the rotation of the workpiece W is stabilized after the inclination of the edge Ta is set in step S02, the inclined surface Wa of the workpiece W is cut using the cutting tool T1 (step S03). In this cutting step, the edge Ta of the cutting tool T1 is moved to an XYZ coordinate position by moving the Z-axis slide 17 in the Z direction, moving the tool post driver 21 in the X direction, and moving the tool holding base 24 in the Y direction. These movements are accomplished by driving the Z-direction drive system M1, X-direction drive system M2, and Y-direction drive system M3, respectively. The X-direction position of the edge Ta determines the amount of cutting of the inclined surface Wa of the workpiece W.

In the present preferred embodiment, the workpiece W is machined while moving the edge Ta of the cutting tool T1 in the Z direction and X direction along the inclined surface Wa of the workpiece W, as well as moving it in the Y direction, which is the direction of a tangent to the inclined surface Wa. The movements of the cutting tool T1 in the X direction, Y direction, and Z direction as described above are made, for example, on the basis of information (machining recipe) preset in a storage or the like included in the controller (not shown). The cutting tool T1 may be moved manually by the operator.

Figure 6A:
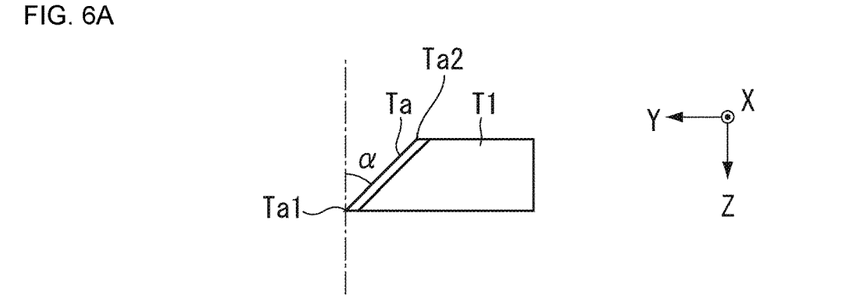
FIG. 6A shows a direction of an edge of a cutting tool with respect to a Z direction.
Figure 6B:
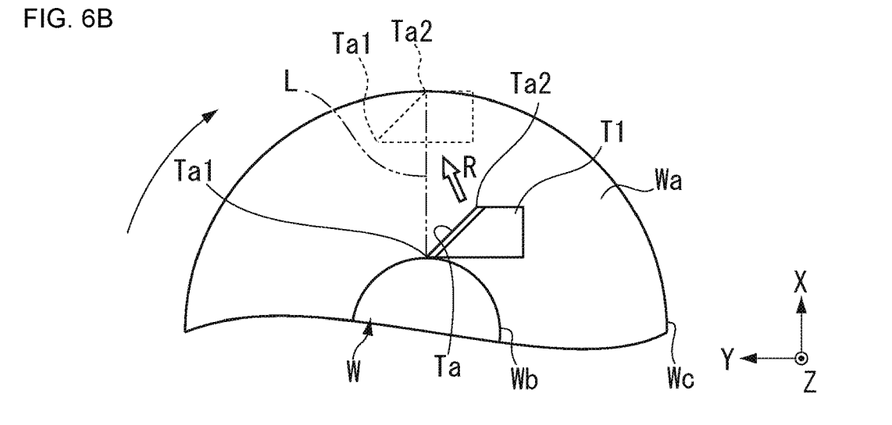
FIG. 6B shows the operation of the cutting tool when seen from the Z direction.
Figure 6C:
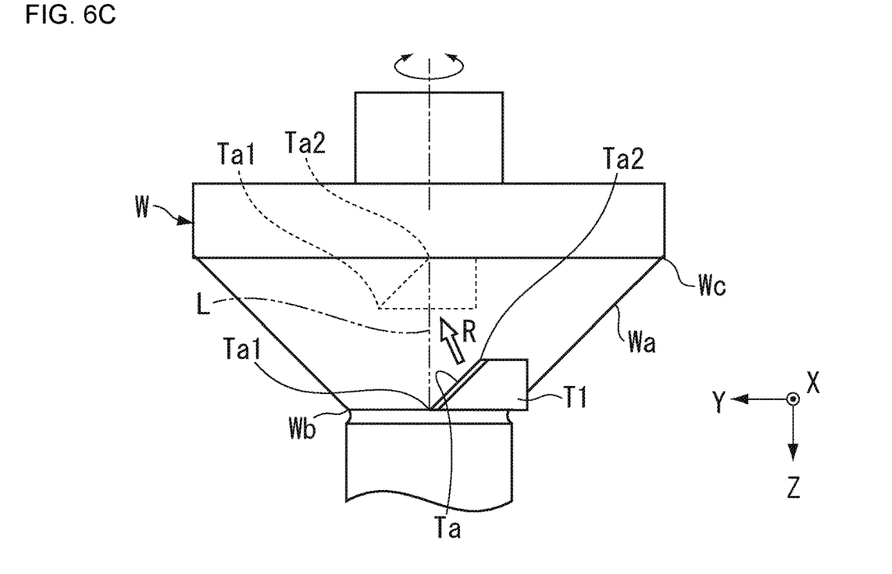
FIG. 6C shows the operation of the cutting tool when the workpiece is seen from an X direction.

FIG. 6A shows the direction of the edge Ta of the cutting tool T1 with respect to the Z direction; FIG. 6B shows the operation of the cutting tool T1 (edge Ta) when the workpiece W is seen in the negative Z direction; and FIG. 6C shows the operation of the cutting tool T1 (edge Ta) when the workpiece W is seen in the negative X direction. As shown in FIG. 6A, the angle of the edge Ta of the cutting tool T1 with respect to the Z direction is set to $\alpha$. Accordingly, when the edge Ta is moved from the negative-Y-side to the positive-Y-side of the workpiece W, the positive-Z-side of the edge Ta first contacts the workpiece W.

As shown in FIGS. 6B and 6C, the cutting in step S03 described above involves moving the edge Ta in a combined direction R obtained by combining the X direction, Y direction, and Z direction. The combined direction R serves as a trajectory along a tangent plane to the inclined surface Wa of the workpiece W. First, a first end Ta1 of the positive-Z-side of the edge Ta contacts a small-diameter portion Wb of the inclined surface Wa (a smallest-diameter portion of the positive-Z-side end), and the first end Ta1 cuts the inclined surface Wa. Then, the edge Ta moves in the combined direction R along the inclined surface Wa. Thus, the cut portion of the workpiece W is gradually shifted from the first end Ta1 toward a second end Ta2 in the negative Z direction. As seen above, while the edge Ta moves in the Y direction, it contacts the inclined surface Wa of the workpiece W along a straight line L and moves in the Z direction.

When the second end Ta2 of the edge Ta reaches a large-diameter portion We of the inclined surface Wa (a largest-diameter portion of the negative-Z-side end), the cutting of the inclined surface Wa is completed. While the inclined surface Wa is cut using the entire edge Ta from the first end Ta1 to the second end Ta2 in the present preferred embodiment, the inclined surface Wa may be cut using a portion of the edge Ta. While the edge Ta travels the straight line L, it moves in the Z direction, as well as in the X direction. Although the edge Ta also moves in the Y direction, the amount of movement involved in the cutting is equal to the distance from the first end Ta1 to second end Ta2 in the Y direction. Accordingly, as shown in FIG. 6A, the amount of movement of the edge Ta in the Y direction varies with the angle a of the edge Ta with respect to the Z direction or the length of the edge Ta from the first end Ta1 to second end Ta2. For example, if the angle of the edge Ta is larger than $\alpha$ or if the edge Ta is longer, the amount of movement of the edge Ta in the Y direction when cutting the inclined surface Wa is increased compared to that shown in FIGS. 6A-6C.

When the edge Ta is moved in the combined direction R, the speed in the X direction of the combined direction R, the speed in the Y direction thereof, and the speed in the Z direction thereof are set such that the respective speeds are constant. However, the speeds need not be constant. For example, the speed in the Y direction may be increased on the small-diameter portion Wb, and the speed in the Y direction may be reduced as the edge Ta approaches the large-diameter portion Wc. In this case, the speed in the Z direction or the speed in the X direction may also be changed in accordance with the change in the moving speed in the Y direction so that the desired inclined surface Wa is cut by the edge Ta.

The moving speed may be changed without changing the moving direction R. When cutting the workpiece W, the relationship among the amount f of movement (the amount of feed) per unit revolution, the distance (radius) r from the rotation center to the cut portion, and the surface accuracy t after cutting is represented by $t=f^2/8r$. Accordingly, if the amount f of feed is constant, a cut portion having a large radius has high surface accuracy t, and a cut portion having a small radius has low surface accuracy t. For this reason, for example, the amount f of feed may be changed in accordance with the radius r of the cut portion so that the surface accuracy t becomes constant. Also, a portion close to the small-diameter portion Wb, of the inclined surface Wa has a smaller radius than a portion close to the large-diameter portion Wc thereof. For this reason, when the portion close to the small-diameter portion Wb is cut, the amount f of feed is reduced; when the portion close to the large-diameter portion Wc is cut, the amount f of feed is increased. Thus, the surface accuracy t is made uniform in the radial direction of the inclined surface Wa.

While an example in which the workpiece W is cut using the cutting tool T1 of the first turret 23 has been described above, the cutting tool T (see FIGS. 1A and 1B) of the second turret 23A may be additionally used to cut the workpiece W. In this case, the cutting tool T of the second turret 23A may be caused to move on a trajectory similar to that of the cutting tool T1 described above on the negative X side of the workpiece W and to cut the inclined surface Wa. The cutting tool T may also be caused to cut a surface other than the inclined surface Wa. If both the cutting tools T1 and T are caused to cut the inclined surface Wa, both may be caused to cut the same orbital portion of the inclined surface Wa in different amounts, or may be caused to cut different portions of the inclined surface Wa.

After the cutting of the workpiece W is completed, the holding of the workpiece W by the grasping claws 9a is released, and the workpiece W is taken out of the machining area of the machine tool 100 by the workpiece conveyor (not shown). The series of operation from the release of holding of the workpiece W by the grasping claws 9a to the taking-out thereof by the workpiece conveyor may be performed, for example, in accordance with an instruction from the controller (not shown) or manually by the operator. If the operation from the bringing-in of the workpiece W to the taking-out thereof is performed by the controller (not shown), the above cutting process is able to be automatically performed. The overall operation may be partially or entirely manually performed rather than automatically.

As seen above, the machine tool 100 of the present preferred embodiment causes the cutting tool T1 to move with respect to the rotating workpiece W in the combined direction R obtained by combining the Z direction, X direction, and Y direction and to cut the inclined surface Wa of the workpiece W. Thus, the inclined surface Wa is able to be cut with improved surface roughness, and the need to grind the inclined surface using a grindstone or the like is eliminated. As a result, the time required to complete the product is significantly reduced. While, for example, average roughness (Ra) is used as surface roughness in the present specification, other indexes may be used.

Second Preferred Embodiment

A machine tool 200 according to a second preferred embodiment of the present invention will be described.

Figure 7A:
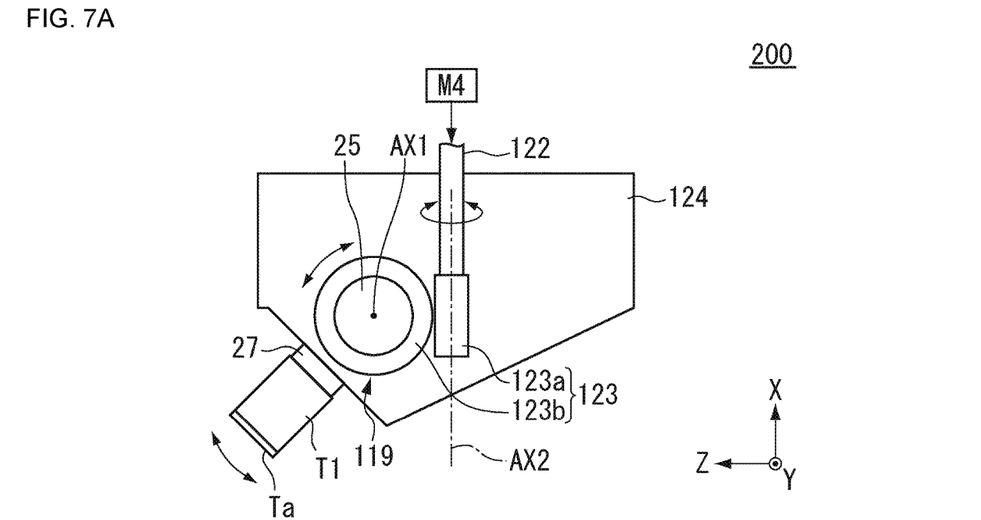
FIG. 7A is a front view and FIG. 7B is a use state view showing an example of a major portion of a machine tool according to a second preferred embodiment of the present invention.
Figure 7B:
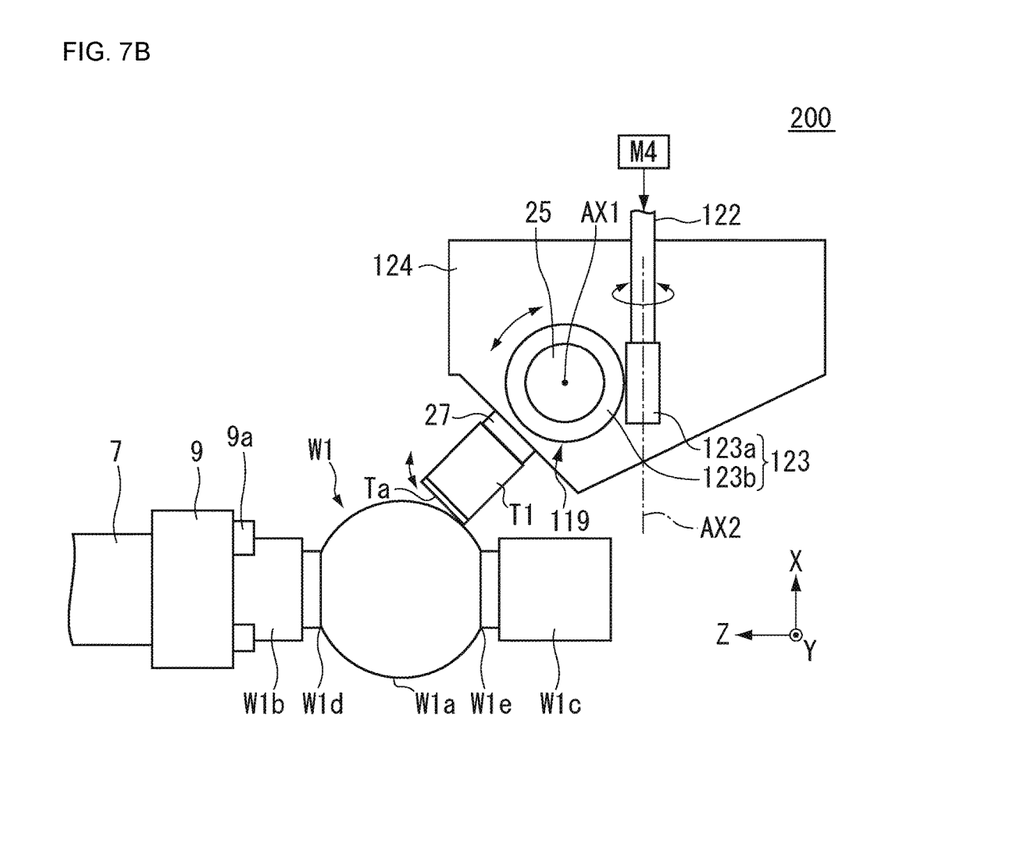

FIGS. 7A and 7B are diagrams showing an example of a major portion of the machine tool 200 of the second preferred embodiment, in which FIG. 7A is a front view; and FIG. 7B is a diagram showing a use state. Elements not shown in FIGS. 7A and 7B are similar to those of the machine tool 100 shown in FIGS. 1A and 1B. Also, elements identical or similar to those in the first preferred embodiment in FIGS. 7A and 7B are given the same reference signs and the description thereof will be omitted or simplified. An angle setting mechanism (tool positioner) 119 of the second preferred embodiment has a configuration different from the angle setting mechanism 19 of the first preferred embodiment.

Figure 8A:
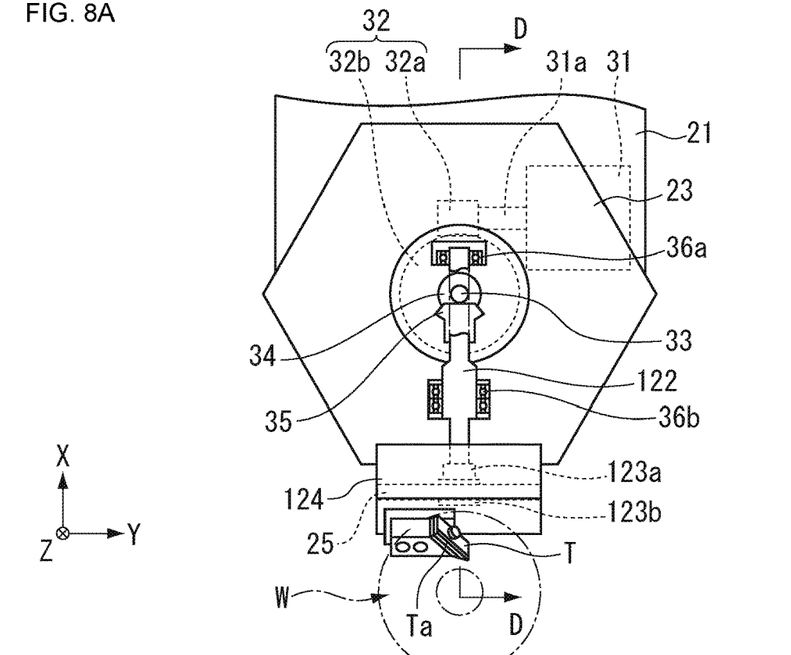
FIG. 8A is a diagram when the inside of a tool post is seen in a positive Z direction.
Figure 8B:
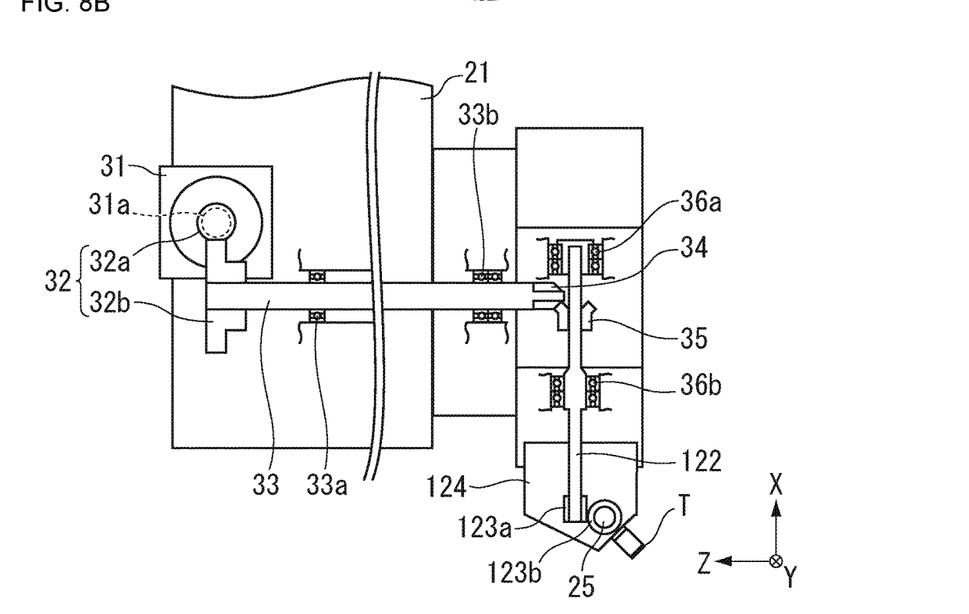
FIG. 8B is a sectional view taken along line D-D in FIG. 8A.

As shown in FIG. 7A, a tool holding base 124 includes the angle setting mechanism 119. The angle setting mechanism 119 includes a drive system M4 that rotates a support shaft 25, a worm shaft 122, and a worm gear 123. An example of the drive system M4 is shown in FIGS. 8A and 8B. FIG. 8A is a diagram when the inside of a first turret 23 (second turret 23A) is seen in the positive Z direction, and FIG. 8B is a sectional view taken along line D-D in FIG. 8A. As shown in FIGS. 8A and 8B, the drive system M4 includes a motor 31, a worm gear 32, a transmission shaft 33, and bevel gears 34 and 35.

The motor 31 is disposed on the positive-Z-side of the first turret 23 and is, for example, mounted on a tool post driver 21. The motor 31 includes an output shaft 31a parallel or substantially parallel with the Y direction. The output shaft 31a is rotated about a rotation axis parallel or substantially parallel with the Y direction. The worm gear 32 includes a screw gear 32a mounted on the output shaft 31a and a helical gear 32b mounted on the transmission shaft 33. The worm gear 32 transmits the rotation of the output shaft 31a to the transmission shaft 33.

The transmission shaft 33 is supported by, for example, bearings 33a and 33b such that the transmission shaft is rotatable about a rotation axis parallel or substantially parallel with the Z direction. The transmission shaft 33 has the helical gear 32b mounted on the positive-Z-side end thereof. The transmission shaft 33 also has the bevel gear 34 mounted on the negative-Z-side end thereof. The bevel gear 34 is engaged with the bevel gear 35. The bevel gear 35 is mounted on the worm shaft 122. The bevel gears 34 and 35 transmit the rotation of the transmission shaft 33 to the worm shaft 122.

The worm shaft 122 is supported by, for example, bearings 33a and 33b such that the worm shaft 122 is rotatable about a rotation axis parallel or substantially parallel with X direction. The worm shaft 122 has a worm 123a mounted on the negative-X-side end thereof. The teeth of the worm 123a are engaged with the teeth of a worm wheel 123b. The worm wheel 123b is fixed to the support shaft 25. Teeth parallel or substantially parallel with the X direction are arranged on the worm wheel 123b in the Y direction. When the worm shaft 122 is rotated, the worm 123a is rotated. Thus, a rotating force is applied to the worm wheel 123b, and the support shaft 25 is rotated by this force.

The worm shaft 122 has a rotation axis AX2 parallel or substantially parallel with the X direction and is rotated in an X-axis rotation direction by a drive force from the drive system M4. The worm shaft 122 is rotatably supported by, for example, the bearings 36a and 36b. The worm gear 123 includes the worm (screw gear) 123a and the worm wheel (helical gear) 123b. The worm 123a is provided on the negative-X-side end of the worm shaft 122 and is rotated about the X axis integrally with the worm shaft 122. The worm wheel 123b is fixed to the support shaft 25. The worm wheel 123b is disposed such that the rotation axis thereof matches the rotation axis AX1 of the support shaft 25. The worm wheel 123b is engaged with the worm 123a and is rotated about the Y axis due to the rotation of the worm 123a. Accordingly, when the worm shaft 122 is rotated, the worm 123a is rotated. Thus, a rotating force is applied to the worm wheel 123b, and the support shaft 25 is rotated due to this force.

When the support shaft 25 is rotated about the Y axis, the inclination of an edge Ta of a cutting tool T1 mounted on a holder 27 is changed and held. As seen above, the angle setting mechanism 119 sets the rotation position of the support shaft 25 in accordance with the drive of the drive system M4 and thus sets the inclination of the edge Ta of the cutting tool T1 mounted on the holder 27.

The rotation position of the support shaft 25 (the inclination of the edge Ta) may be controlled, for example, by a controller (not shown) included in the machine tool 200 or manually by the operator. Or, a sensor that detects the inclination of the edge Ta may be disposed so that the inclination of the edge Ta is controlled in accordance with an output from the sensor. Such a sensor may be an optical or magnetic non-contact sensor. Note that the support shaft 25 need not be rotated in a manner shown in FIGS. 7A and 7B. For example, a servo motor or the like may directly rotate the support shaft 25.

FIG. 7B is a diagram showing an aspect in which a workpiece W1 having a curved surface W1a is cut using the machine tool 200 of the second preferred embodiment. As shown in FIG. 7B, the workpiece W1 has the curved surface W1a sandwiched between shafts W1b and W1 thereof. The curved surface W1a has a spherical shape bent from an end W1d adjacent to the shaft W1b to an end W1e adjacent to the shaft W1c with a predetermined curvature. The shaft W1b of the workpiece W1 is held by grasping claws 9a, and the workpiece W1 is rotated about the Z direction axis due to the rotation of a main spindle 7.

In order to machine the curved surface W1a of the workpiece W1 thus configured, first, the inclination of the edge Ta is set so as to match the direction of a tangent to the end W1e. As described above, the inclination of the edge Ta is set by driving the drive system M4 to rotate the support shaft 25. Then, the edge Ta is moved in the Z direction, as well as in the X direction and Y direction. Further, the support shaft 25 is rotated so that the direction of the edge Ta becomes the direction of a tangent to the curved surface W1a, thus continuously changing the inclination of the edge Ta. The above operation is performed until the edge Ta reaches the end W1d. Thus, the curved surface W1a is able to be cut.

Depending on the shape of the curved surface W1a, the inclination of the edge Ta may fail to follow the curved surface. For example, as shown in FIG. 7B, it is difficult to incline the edge Ta in the direction of a tangent to the positive-Z-side of the curved surface W1a. In this case, the entire curved surface W1a is able to be cut, for example, by first cutting the curved surface W1a from the end W1e to a largest-diameter portion, then detaching the shaft W1b of the workpiece W1 from the grasping claws 9a, causing the grasping claws 9a to hold the shaft W1c, and cutting the curved surface W1a from the end W1d to the largest-diameter portion.

As seen above, according to the present preferred embodiment, the direction of the edge Ta of the cutting tool T1 is able to be changed during cutting. Thus, it is possible to cause the edge Ta to match even the curved surface W1a, in which the inclination of the surface to be machined is continuously changed. Further, as in the first preferred embodiment, the surface roughness of the curved surface W1a is able to be improved, and the need for grind the curved surface is eliminated. As a result, the time until the product is completed is significantly reduced.

If a second turret 23A is disposed on the negative-X-side of the workpiece W1 (see FIGS. 1 A and 1 B), the entire curved surface W1a is able to be cut without having to cause the grasping claws 9a to hold the workpiece W1 again, for example, by causing the cutting tool T1 shown in FIGS. 7A and 7B to cut the curved surface W1a from the end W1e to the largest-diameter portion and, at the same time, causing a cutting tool T of the second turret 23A to cut the curved surface W1a from the end W1d to the largest-diameter portion. Further, in the second preferred embodiment, the ends W1d and W1e of the curved surface W1a have smaller diameters than the other portions of the curved surface W1a. For this reason, the surface roughness of the curved surface W1a is able to be made uniform by reducing the moving speed (the amount of feed) of the cutting tool T1 near the ends W1d and W1e and increasing the amount of feed on the other portions of the curved surface W1a including the largest-diameter portion.

While the preferred embodiments have been described above, the present invention is not limited thereto. Various changes can be made to the preferred embodiments without departing from the spirit and scope of the present invention. For example, in the description of the above preferred embodiments, the cutting tool T or T1 is preferably moved in parallel or substantially parallel with the Y direction by moving the tool holding base 24 or 124, but other processes and configurations may be used.

Figure 9A:
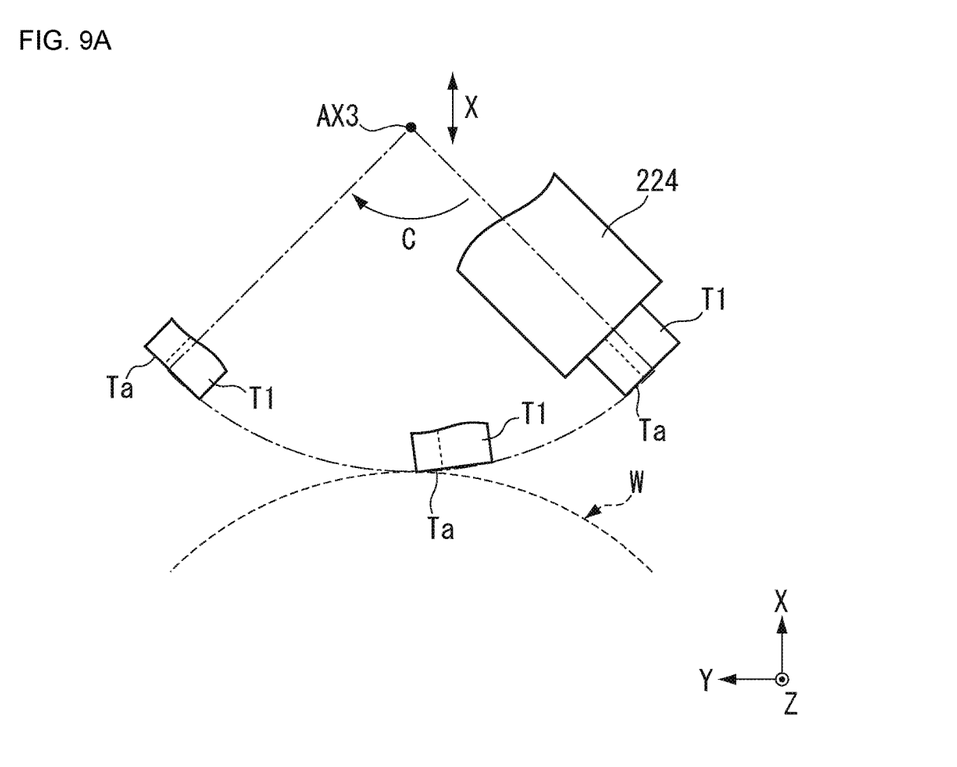
FIGS. 9A and 9B are diagrams showing the operation of a cutting tool in a machine tool of a modification of a preferred embodiment of the present invention.

For example, as shown in FIG. 9A, a configuration may be used in which a tool holding base 224 holding a cutting tool T1 is rotatable in an axis rotation direction C of a rotation axis AX3 parallel or substantially parallel with the Z axis. This configuration is similar to the preferred embodiments in that the tool holding base 224 is movable in the Z direction and X direction by a moving device (not shown). In this configuration, synchronous control is performed so that the tool holding base 224 is rotated in the axis rotation direction C of the rotation axis AX3 and is moved in the X direction. Thus, it is possible to cause the edge of the cutting tool T1 to match an inclined surface Wa of a workpiece W, as shown in FIG. 6B for example. In this case, the edge Ta of the cutting tool T1 is moved in a direction obtained by combining the Z direction, X direction, and the axis rotation direction C of the rotation axis AX3, and cuts the workpiece W.

Figure 9B:
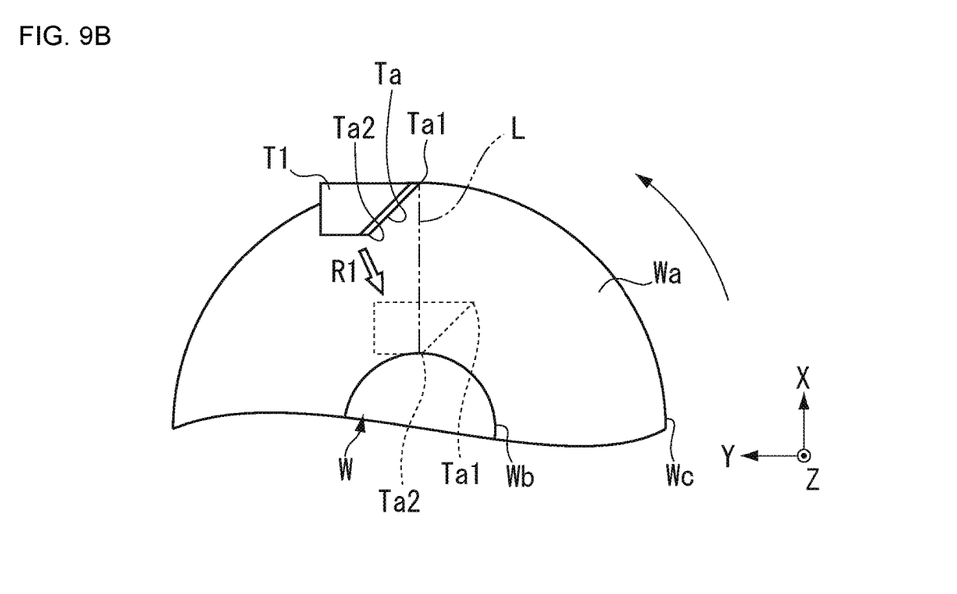

In the above preferred embodiments, the edge Ta of the cutting tool T1 preferably cuts the workpiece W from the small-diameter portion Wb toward the large-diameter portion Wc. Conversely, as shown in FIG. 9B, the edge Ta of the cutting tool T1 may cut the workpiece W from the large-diameter portion Wc toward the small-diameter portion Wb. In this case, for example, the workpiece W is rotated in a direction opposite to the rotating direction of the workpiece W in the preferred embodiments; the cutting tool T1 is disposed such that the first end Ta1 of the edge Ta contacts the large-diameter portion We of the inclined surface Wa; and the first end Ta1 initially cuts into the inclined surface Wa. Then, the edge Ta is moved in a combined direction R1 along the inclined surface Wa. Thus, the cut portion of the workpiece W is gradually shifted from the first end Ta1 toward a second end Ta2 in the positive Z direction. The combined direction R1 is a direction obtained by combining the X direction, Y direction, and Z direction and serves as a trajectory along a tangent plane to the inclined surface Wa of the workpiece W. Also, the combined direction R1 is a direction opposite to the combined direction R in the preferred embodiments. When the second end Ta2 of the edge Ta reaches the small-diameter portion Wb of the inclined surface Wa, the cutting of the inclined surface Wa is completed.

While, in the description of the above preferred embodiments, the first turret 23 is preferably able to move in the Z direction, X direction, and Y direction, other configurations may be used. For example, a configuration may be used in which a tool holding base 24 or 124 is able to move in the Y direction with respect to a first turret 23. In this case, another drive system is disposed in the first turret 23. The same applies to a second turret 23A.

While, in the description of the preferred embodiments, the angle setting mechanism 19 or 119 that sets the angle of the edge Ta with respect to the Z direction when seen from the Y direction is preferably used as the tool positioner, other configurations may be used. For example, a configuration may be used in which a tool positioner does not set the angle of the edge Ta with respect to the Z direction when seen from the Y direction but rather disposes a tool at a fixed angle.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A machine tool that cuts a workpiece having an inclined surface, the machine tool comprising:
    a main spindle that holds the workpiece and rotates the workpiece around an axis that extends in a Z direction;
    a moving device that moves a cutting tool relative to the workpiece in the Z direction, an X direction that is perpendicular or substantially perpendicular to the Z direction and determines a depth of cutting of the workpiece, and a Y direction perpendicular or substantially perpendicular to the Z direction and the X direction, and further in a combined direction obtained by combining the Z direction, the X direction, and the Y direction, the cutting tool including a linear cutting blade to cut the workpiece; and
    a tool positioner that adjusts the linear cutting blade by inclining a direction of an edge of the linear cutting blade of the cutting tool with respect to the Z direction when seen from the Y direction in a state in which the direction of the edge of the linear cutting blade is inclined with respect to the Z direction when seen from the X direction so that a straight line on the inclined surface along the Z direction when seen from the X direction is parallel to the edge of the linear cutting blade when seen from the Y direction; wherein
    the straight line on the inclined surface is inclined with respect to the Z direction when seen from the Y direction;
    a length of the edge of the linear cutting blade when seen from the Y direction is shorter than a length of the inclined surface when seen from the Y direction; and
    the moving device moves the cutting tool relative to the workpiece in the combined direction so that the edge of the linear cutting blade cuts the workpiece while moving in the Y direction with respect to the workpiece, and while maintaining the edge of the linear cutting blade parallel to the straight line on the inclined surface when seen from the Y direction.

2. The machine tool of claim 1, further comprising a tool post that holds the cutting tool, wherein
    the moving device moves the cutting tool in the Z direction, the X direction, and the Y direction through the tool post.

3. The machine tool of claim 2, wherein the tool positioner is located between the tool post and the cutting tool.

4. The machine tool of claim 1, wherein the tool positioner includes an angle setting mechanism that sets an angle of the edge with respect to the Z direction when seen from the Y direction.

5. The machine tool of claim 4, wherein the angle setting mechanism comprises:
    a shaft including a rotation axis along the Y direction; and
    a holder that is located on a portion of the shaft and holds the cutting tool.

6. The machine tool of claim 5, further comprising a lock sleeve that is press-fitted between the holder and the shaft and holds a rotation position of the shaft.

7. The machine tool of claim 6, further comprising an adjustment mechanism that adjusts the rotation position of the shaft.

8. The machine tool of claim 5, further comprising a drive system that rotates the shaft with respect to the holder and holds the shaft in a predetermined rotation position.

9. A method for cutting a workpiece having an inclined surface, the method comprising:
    a step of holding the workpiece and rotating the workpiece around an axis that extends in a Z direction;
    a step of adjusting a linear cutting blade of a cutting tool to cut the workpiece by inclining a direction of an edge of the linear cutting blade with respect to the Z direction when seen from an X direction, in which a depth of cutting of the workpiece is determined, and making a straight line on the inclined surface along the Z direction, when seen from the X direction, that is parallel to the edge of the linear cutting blade when seen from a Y direction perpendicular or substantially perpendicular to the Z direction and the X direction; and
    a step of cutting the workpiece while moving the cutting tool relative to the workpiece in a combined direction obtained by combining the Z direction, the X direction, and the Y direction; wherein
    the straight line on the inclined surface is inclined with respect to the Z direction when seen from the Y direction;
    a length of the edge of the linear cutting blade when seen from the Y direction is shorter than a length of the inclined surface when seen from the Y direction; and
    in the step of cutting the workpiece, the edge of the linear cutting blade cuts the workpiece while moving in the Y direction with respect to the workpiece, and while maintaining the edge of the linear cutting blade parallel to the straight line on the inclined surface when seen from the Y direction.

10. A machine tool that cuts a workpiece having an inclined surface or a curved surface, the machine tool comprising:
    a main spindle that holds and rotates the workpiece;
    a moving device that moves a cutting tool relative to the workpiece in a direction obtained by combining a Z direction parallel or substantially parallel with an axis of the main spindle, an X direction that is perpendicular or substantially perpendicular to the Z direction and determines a depth of cutting of the workpiece, and one of a Y direction perpendicular or substantially perpendicular to the Z direction and the X direction and an axis rotation direction parallel or substantially parallel with the Z direction, the cutting tool including a linear cutting blade to cut the workpiece; and
    a tool positioner that sets a direction of an edge of the cutting tool to an angle of the inclined surface or a tangent of the curved surface of the workpiece by inclining a direction of the edge with respect to the Z direction when seen from the Y direction in a state in which the direction of the edge is inclined with respect to the Z direction when seen from the X direction; wherein
    the tool positioner includes an angle setting mechanism that sets the angle of the edge with respect to the Z direction when seen from the Y direction.

11. The machine tool of claim 10, wherein the angle setting mechanism comprises:
    a shaft including a rotation axis along the Y direction; and
    a holder that is located on a portion of the shaft and holds the cutting tool.

12. The machine tool of claim 11, further comprising a lock sleeve that is press-fitted between the holder and the shaft and holds a rotation position of the shaft.

13. The machine tool of claim 12, further comprising an adjustment mechanism that adjusts the rotation position of the shaft.

14. The machine tool of claim 13, further comprising a drive system that rotates the shaft with respect to the holder and holds the shaft in a predetermined rotation position.

* * * * *